US008924267B1

(12) United States Patent
Terranova

(10) Patent No.: US 8,924,267 B1
(45) Date of Patent: Dec. 30, 2014

(54) REMOTE PAYMENT ACCOUNT RELATIONAL SYSTEM AND METHOD FOR RETAIL DEVICES

(75) Inventor: Steven N. Terranova, Cary, NC (US)

(73) Assignee: Gilbarco Inc., Greensboro, NC (US)

( * ) Notice: Subject to any disclaimer, the term of this patent is extended or adjusted under 35 U.S.C. 154(b) by 402 days.

(21) Appl. No.: 09/685,276

(22) Filed: Oct. 10, 2000

(51) Int. Cl.
*G06Q 40/00* (2012.01)

(52) U.S. Cl.
USPC .......................................................... 705/35

(58) Field of Classification Search
USPC ............... 700/237, 232; 235/381, 492; 705/8, 705/35–38, 26, 36 R; 70/232; 709/217, 230; 379/22

See application file for complete search history.

(56) References Cited

U.S. PATENT DOCUMENTS

| 5,578,808 | A |   | 11/1996 | Taylor ........................... 235/380 |
| 5,602,745 | A |   | 2/1997 | Atchley et al. ............ 364/464.23 |
| 5,623,547 | A | * | 4/1997 | Jones et al. ...................... 705/68 |
| 5,778,067 | A | * | 7/1998 | Jones et al. ...................... 705/65 |
| 5,842,188 | A |   | 11/1998 | Ramsey et al. ................ 705/416 |
| 5,857,175 | A |   | 1/1999 | Day et al. ......................... 705/14 |
| 5,915,023 | A |   | 6/1999 | Bernstein ......................... 380/24 |
| 5,960,406 | A | * | 9/1999 | Rasansky et al. .................. 705/9 |
| 5,999,624 | A |   | 12/1999 | Hopkins .......................... 380/24 |
| 6,031,459 | A |   | 2/2000 | Lake ........................... 340/572.8 |
| 6,032,126 | A |   | 2/2000 | Kaehler .......................... 705/16 |
| 6,032,133 | A |   | 2/2000 | Hilt et al. ......................... 705/40 |
| 6,032,136 | A |   | 2/2000 | Brake, Jr. et al. ................ 705/41 |
| 6,055,521 | A | * | 4/2000 | Ramsey et al. ................ 705/413 |
| 6,058,382 | A |   | 5/2000 | Kasai et al. ...................... 705/41 |
| 6,058,402 | A |   | 5/2000 | Feiken ........................... 708/144 |
| 6,062,473 | A |   | 5/2000 | Blalock et al. ................ 235/381 |
| 6,064,988 | A |   | 5/2000 | Thomas .......................... 705/44 |
| 6,073,840 | A |   | 6/2000 | Marion .......................... 235/381 |
| 6,098,879 | A |   | 8/2000 | Terranova ...................... 235/384 |

(Continued)

FOREIGN PATENT DOCUMENTS

| WO | WO 96/06415 | 2/1996 |
| WO | WO 97/24689 | 7/1997 |
| WO | WO 99/08218 | 2/1999 |

OTHER PUBLICATIONS

Le Vocabulaire des Lais de Marie de France, McClelland, Denise, ProQuest Dissertations and Theses; 1972; ProQuest Dissertations & Theses Full Text pg. n/a.*

*Primary Examiner* — Hani M Kazimi
*Assistant Examiner* — Clement B Graham
(74) *Attorney, Agent, or Firm* — Nelson Mullins Riley & Scarborough, LLP

(57) ABSTRACT

A retail transactions station capable of identifying a customer, retrieving transaction account information associated with the customer, and charging the customer's purchases to the transaction account is operative to receive new transaction account information from the customer at the retail transactions station, verify the transaction account, and associate the new transaction account with the customer for pending and future purchases. In one embodiment, with the retail transactions station identifies the customer via an RFID interrogator at the retail transactions station and a corresponding RFID transponder in the customer's possession. New transaction account information is obtained via a magnetic stripe card reader at the retail transactions station. In another embodiment, the retail transactions station comprises a fuel dispenser. In another embodiment, a system comprises a retail transactions station operative to identify a customer and receive transaction account information, a database containing customer identifiers and associated valid transaction accounts, and a controller operative to control the database and to perform financial transaction processing across a network.

20 Claims, 9 Drawing Sheets

(56) References Cited

U.S. PATENT DOCUMENTS

| | | | | |
|---|---|---|---|---|
| 6,116,505 | A * | 9/2000 | Withrow | 235/381 |
| 6,175,382 | B1 * | 1/2001 | Mohr | 348/150 |
| 6,226,623 | B1 * | 5/2001 | Schein et al. | 705/35 |
| 6,338,008 | B1 * | 1/2002 | Kohut et al. | 700/237 |
| 6,611,818 | B1 * | 8/2003 | Mersky et al. | 705/40 |
| 6,629,080 | B1 * | 9/2003 | Kolls | 705/26 |
| 6,631,849 | B2 * | 10/2003 | Blossom | 235/492 |
| 6,636,585 | B2 * | 10/2003 | Salzberg et al. | 379/22 |
| 6,810,304 | B1 * | 10/2004 | Dickson | 700/241 |
| 7,233,929 | B1 * | 6/2007 | Lingle et al. | 705/402 |
| 7,640,185 | B1 * | 12/2009 | Giordano et al. | 705/23 |

* cited by examiner

REMOTE PAYMENT ACCOUNT RELATIONAL SYSTEM AND METHOD FOR RETAIL DEVICES

FIELD OF THE INVENTION

The present invention relates to retail transaction processing, and particularly to transactions at a retail transaction station wherein the customer may alter or update the transaction account associated with the customer at the retail transaction station.

BACKGROUND OF THE INVENTION

Retail transaction stations, such as for example, the CRIND® (Card Reader in Dispenser) system for fuel dispensers manufactured and sold by Marconi Commerce Systems, the assignee of the present invention, have long included the ability for customers to pay for their purchase directly at the station using a credit or debit card. This is usually accomplished by providing a card reader in the station to read transaction account information from the magnetic stripe of the customer's credit card. In most cases, the customer can use one of several accepted credit or debit cards.

A more modern development in retail transaction station technology is the automatic recognition of customers, such as though the use of a Radio Frequency Identification (RFID) transponder. An example of such a system is the TRIND™ (Transponder Reader in Dispenser) system for fuel dispensers manufactured and sold by Marconi Commerce Systems. Each RFID transponder communicates an identification code when interrogated by an RFID interrogator located at the retail transaction station. This identification code is associated with a particular customer. A controller associated with the station accesses a database that associates the identification code or other customer identifier with a particular transaction account to which the customer has previously authorized access.

The automatic customer recognition and payment is typically set up when the customer purchases or is issued an RFID transponder, or "tag." The customer activates the transponder by supplying transaction account information, such as a credit card or debit card account number, expiration date, and the like. Typically the customer either calls a toll-free telephone number and provides this information to a customer service representative, or enters the information on a form and mails or faxes the form to an account center. Once approved and activated, the system greatly enhances the ease and convenience to the customer of making retail purchases at a retail transaction station, such as for example, purchasing fuel from a fuel dispenser. The customer simply brings the RFID transponder, which may be located on or in his or her vehicle, on a key chain, in a card in his or her wallet, etc., into the operative range of the interrogator at the retail transaction station. The customer is recognized, and purchases made at the retail transaction station are automatically charged to the previously supplied transaction account. An example of such a system is described in PCT Patent WO 97/24689 by Dresser Industries, Inc., Mobil Oil Corp., and Texas Instruments, Inc. entitled "Dispensing System and Method with Radio Frequency Customer Identification."

However, the above described system lacks in convenience in at least one aspect. The system does not allow the customer to directly establish or change the transaction account associated with his or her transponder in the system. A customer may have changed his primary transaction account to another financial service provider, or may wish to charge certain classes of purchases to a different transaction account. Thus there exists a need for a customer to be able to quickly and easily supply a new or additional transaction account at the retail transaction station, at the time of his or her retail purchase, or alternatively at his or her convenience, without requiring the customer to interact with a customer service representative, or to mail or fax in a form.

SUMMARY OF THE INVENTION

The present invention entails a method and system of associating a customer transaction account with a customer identifier for processing transactions at a retail transaction station.

In one embodiment, the method includes identifying the customer, obtaining transaction account information from the customer at the retail transaction station, and associating that transaction account information with the customer.

In another embodiment, the method comprises obtaining a customer identifier from an RFID transponder in the customer's possession via an RFID interrogator at a fuel dispenser, obtaining transaction account information from the customer via a magnetic stripe card reader at the fuel dispenser, and associating the transaction account information with the customer identifier.

In another embodiment, a retail transaction station that includes a controller, and an interrogator and a transaction account reader both communicatively coupled to the controller, obtains a customer identifier through the interrogator via wireless communication to a communication device, and associates the customer identifier with transaction account information ascertained from the transaction account reader.

In another embodiment of the present invention, a fuel dispenser is operative to recognize a customer by reading a code from a transponder in the customer's possession via an interrogator at the fuel dispenser. The fuel dispenser also includes a magnetic stripe card reader for reading transaction account information from the customer at the fuel dispenser. The transaction account information is associated with the customer identifier in a database, and the transaction account is accessed across a network to process fuel purchase transactions and other transactions performed at the fuel dispenser.

In another embodiment, a system for conducting financial transactions by a customer includes a retail transaction station, a database, and a processing station. The retail transaction station includes a customer identification unit and a card reader for obtaining a customer identifier and transaction account information, respectively. The customer identifier and transaction account information are directed to the processing station. The processing station associates the customer identifier with the transaction account information, and stores both items in a database. The processing station then accesses the transaction account across a network and performs the transaction processing to pay for the customer's purchase of goods and/or services at the retail transaction station.

BRIEF DESCRIPTION OF THE DRAWINGS

FIGS. 2, 2A, 2B, 2C illustrates various types of transponders.

DETAILED DESCRIPTION OF THE INVENTION

The present invention comprises a system that enables a customer at a retail transaction station to input information identifying a transaction account directly at the retail transaction station. The transaction account information is uniquely associated with the customer and this association is preserved in a database. The database is controlled by a processing station, which may be contained within the retail transaction station or may be located remotely from and communicatively connected to the retail transaction station. The processing station is further connected to a network for performing financial transaction processing with the customer's transaction account to effect payment for goods and/or services that the customer purchases at the retail transaction station.

As used herein, the term "transaction account" is to be construed broadly. It refers to any financial account that a customer may use to pay for purchases at a retail transaction station. A transaction account may include, for example, a credit card or debit card account; a checking account, money market fund, or other cash account; a line of credit, purchase order, or similar accounting by the seller of the goods and/or services; a routing number or authorization code for electronic transfer of funds; or the like. Similarly, as used herein, the term "transaction account information" is to be construed broadly to encompass any information necessary to identify, access, debit, transfer from, or charge to the transaction account. The most common transaction account information comprises a credit or debit card account number, but additionally or alternatively may comprise an electronic funds routing number, purchase order number, or similar information. In general, a "transaction account" is a source of credit or funds to pay for a customer's purchase, and "transaction account information" is the account number, access code, or any other information necessary to access the transaction account.

As used herein, to "access" a transaction account is to perform such steps as are necessary to locate the account, verify or validate that the customer is authorized to debit or charge to the account, and effect payment for the customer's goods and/or services from the transaction account. In particular applications, a system may initially access a transaction account to obtain authorization for a pending purchase, such as the dispensing of fuel from a fuel dispenser, and subsequently access the transaction account to charge a known total. In other applications, a system may access a transaction account only once, to charge a known total amount. A transaction account may be accessed across a wide area computer network, with communications links comprising wired and wireless telephone lines, satellite communications, terrestrial radio links, and the like. Transaction account processing is well known in the art, and the specifics of accessing an account are not further elucidated herein.

Figure 1:
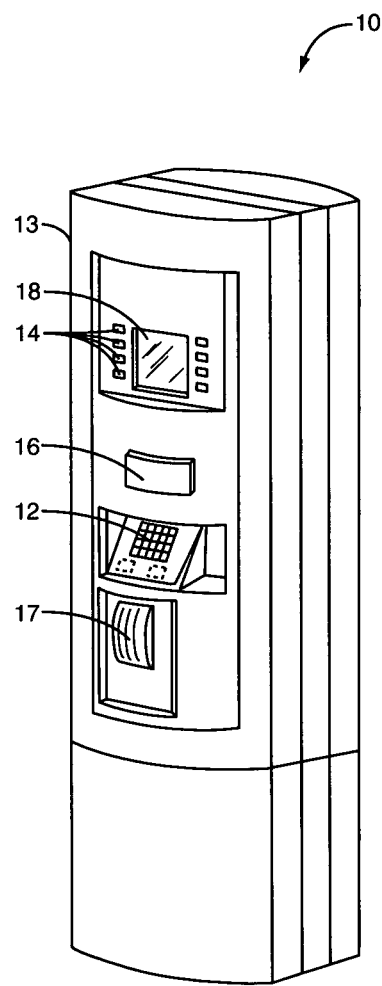
FIG. 1 is a perspective view of a retail transaction station.

The present invention is described with reference to drawing figures. FIGS. 1-3 describe the general technology and business background to which the present invention relates.

A description of one embodiment of the present invention is made with reference to FIG. 1, depicting a retail transaction station, indicated generally by the numeral 10. A retail transaction station 10 is a system equipped and operative for interaction with customers to facilitate the purchase of goods and/or services. For example, goods purchased may comprise information, data, or entertainment in electronic form. Examples include news reports, weather forecasts, and music, video, or other content in electronic format, that the customer many order and purchase at the retail transaction station, and that may additionally be downloaded directly into the customer's automotive computer, handheld computing device, musical playback device, or the like. Services may include a car wash purchase, placing a telephone call, ordering a movie rental, etc. As illustrative examples, the following pending patent applications are incorporated herein in their entirety: Ser. No. 09/483,074, "Multistage Data Purchase," describing a retail transaction station for the delivery of information purchased over a computer network; Ser. No. 09/482,281, "Multistage Forecourt Data Order and/or Purchase," describing the order and purchase of a variety of goods and services through a retail transaction station in a fueling environment; and Ser. No. 09/483,079, "Retailing Audio Files in a Fuel Dispensing Environment," describing the order and purchase of music through a retail transaction station in a fueling environment. Another example of a retail transaction station 10 may include a vending machine. One such device is described in PCT Patent Application WO 96/06415, "Method and Apparatus for Vending Goods in Conjunction with a Credit Card Accepting Fuel Dispensing Pump," the disclosure of which is incorporated herein in its entirety. In general, any type of goods and/or services may be ordered and purchased through a retail transaction station 10; the above examples are illustrative only, and not limiting.

The retail transaction station 10 contains at least one input device functional to establish customer communication with the retail transaction station 10 for the selection of desired goods and/or services. The input could comprise a mechanism requiring tactile contact by the consumer, for example a keyboard, keypad, touch screen display, or programmable function keys. Alternatively, the input may be of a form that requires no physical contact, such as a transponder or other wireless communication, a smart card, speech recognition, or a direct link to a secondary device such as a PDA or laptop computer. In the embodiment depicted in FIG. 1, the retail transaction station 10 contains a keypad 12 disposed in housing 13, and soft function keys 14 disposed along display 18 as input devices.

Retail transaction station 10 may also contain a payment device for allowing the customer to pay for his purchases. This may be done directly, for example with a cash acceptor operative to accept and verify currency and coins. One example of a cash acceptor is described in U.S. Pat. No. 5,842,188, "Unattended Automated System for Selling and Dispensing with Change Dispensing Capability." Alternatively, the payment device may be effective to read transaction account information, for example, a magnetic stripe card reader. Alternatively, or additionally, a payment device may comprise an interrogator effective to read payment information wirelessly from a customer transponder. An illustrative example of a transponder payment device is disclosed in U.S. Pat. No. 6,073,840, "Fuel Dispensing and Retail System Providing for Transponder Prepayment," the disclosure of which is incorporated herein in its entirety. The payment device may alternatively comprise an optical reader effective to detect and interpretive visual indicia, such as a bar code. An illustrative example of a bar code reader payment device is disclosed in U.S. Pat. No. 6,062,473, "Energy Dispensing System Having a Bar Code Scanning Unit," the disclosure of which is incorporated herein in its entirety. Additionally or alternatively, the payment device may be effective to recognize the consumer, either to thereby associate previously stored transaction account information with the consumer, or as a security measure to validate transaction account information otherwise received. This may comprise, for example, a camera and associated facial recognition system. As an example of a retail transaction station having a camera incorporated therein, the disclosure of U.S. Pat. No. 6,032,126, "Audio and AudioNideo Operator Intercom for a Fuel Dispenser" is incorporated herein in its entirety. Alternatively, a payment device with customer recognition may include a biometric sensor, for example, a camera effective to detect and interpretive eye iris patterns, a fingerprint detector, or the like.

In the embodiment depicted in FIG. 1, the retail transaction station 10 contains an interrogator 16 disposed in housing 13 for identifying customers via a transponder in the customer's possession, as is more fully explained below. Retail transaction station 10 additionally contains a magnetic stripe card reader 17 disposed in housing 13 that is operative to read transaction account information from a customer's credit card. The card reader 17 may serve as a payment device for new customers or those not recognized by interrogator 16. Additionally, card reader 17 functions as an input device, to receive transaction account information from a recognized customer to update or alter the transaction account associated with his customer identifier. However, the present invention is not limited to a magnetic stripe card reader for these functions. Transaction account information may additionally or alternatively be read by a bar code reader, for example, or other account information reader, as known in the art.

The retail transaction station 10 additionally includes an output to facilitate communication with the customer. The output may present the customer with instructions, and various menus or other selections of goods and/or services available for purchase.

An output may comprise a text or graphic output display, that may be of any technology or type known in the art, illustratively including any of a variety of liquid crystal displays (LCD), both Passive Matrix (PMLCD) and Active Matrix (AMLCD)—including Thin-Film Transistor (TFT-LCD), Diode Matrix, Metal-Insulator Metal (MIM), Active-Addressed LCD, Plasma-Addressed Liquid Crystal (PALC), or Ferroelectric Liquid Crystal Display (FLCD). Alternatively, the display may comprise Plasma Display Panel (PDP), Electroluminescent Display (EL), Field Emission Display (FED), Vacuum Fluorescent Displays (VFD), Digital Micromirror Devices (DMD), Light Emitting Diodes (LED), Electrochromic Display, Light Emitting Polymers, video display (cathode ray tube or projection), holographic projection, etc. The display technologies discussed above are illustrative in nature, and not intended to be limiting.

The output may be audible. Additionally, the output may provide for the actual delivery of goods in electronic form. This may be accomplished through communication to a secondary devise, such as a computer in the consumer's automobile, a PDA or laptop computer, a mobile telephone terminal, a musical playback device, or the like. Connection to the secondary device may be through a wired connection, as through a plug provided on the retail transaction station 10, or over a wireless radio or optical connection.

In the embodiment depicted in FIG. 1, the retail transaction station 10 contains an output display 18 disposed in housing 13. Soft function keys 14, disposed along the sides of display 18, may be programmed to cooperate with a menu presented on display 18 to facilitate interaction with the customer.

Interrogator 16, contained in retail transaction station 10, may be a Radio-Frequency Identification (RFID) interrogator. As used herein, the term "interrogator" refers to a wireless communications device capable of establishing communications with a plurality of corresponding wireless communication devices, herein referred to as "transponders," for the purpose of discriminating among and identifying individual transponders, e.g., by receiving and decoding an identification code. Wireless interrogators are also referred to in the art as "readers." Interrogator 16 is operative to detect and read an identification code from transponders, also commonly referred to in the art as "tags," within its range. The range of interrogator 16 is designed and configured so as to encompass the area in the immediate vicinity of retail transaction station 10, but no further. Specifically, the range of interrogator 16 should be extensive enough to detect the transponders carried by customers who wish to access the retail transactions station 10 to purchase goods and/or services.

RFID transponders may be passive devices, i.e., not requiring batteries or other sources of power, that communicate by altering an electromagnetic field emitted by the interrogator. Transponders may alternatively be active devices powered by batteries, solar cells, or other power sources, and may include their own RF transmission circuits and elements. It will be readily understood to one of ordinary skill in the art that there are many different types of transponders that allow electronic communication and that the present invention is not limited to any one particular type. Whatever the type, the transponders are capable of communicating with interrogator 16. Each transponder is programmed with a unique identification code that it transmits to interrogator 16 whenever it comes within range. A transponder is issued to or purchased by a customer, and the customer carries the transponder, or alternatively, may have the transponder mounted to his or her vehicle. As used herein, a transponder "in the customer's possession" means a transponder physically proximate to the customer, whether carried by or on the customer or attached to or mounted on or in the customer's vehicle. When the customer approaches the retail transactions station 10, his or her transponder communicates its unique identification code to the interrogator 16, thus uniquely identifying the individual customer.

Figure 2A:
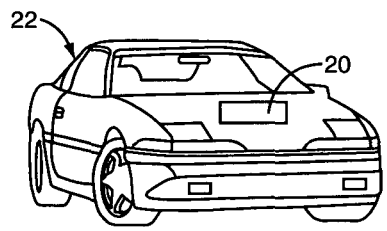
Figure 2B:
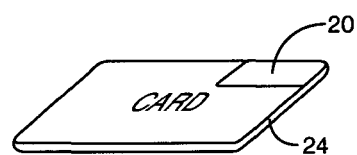
Figure 2C:
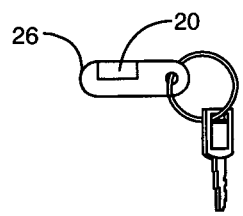
Figure 3:
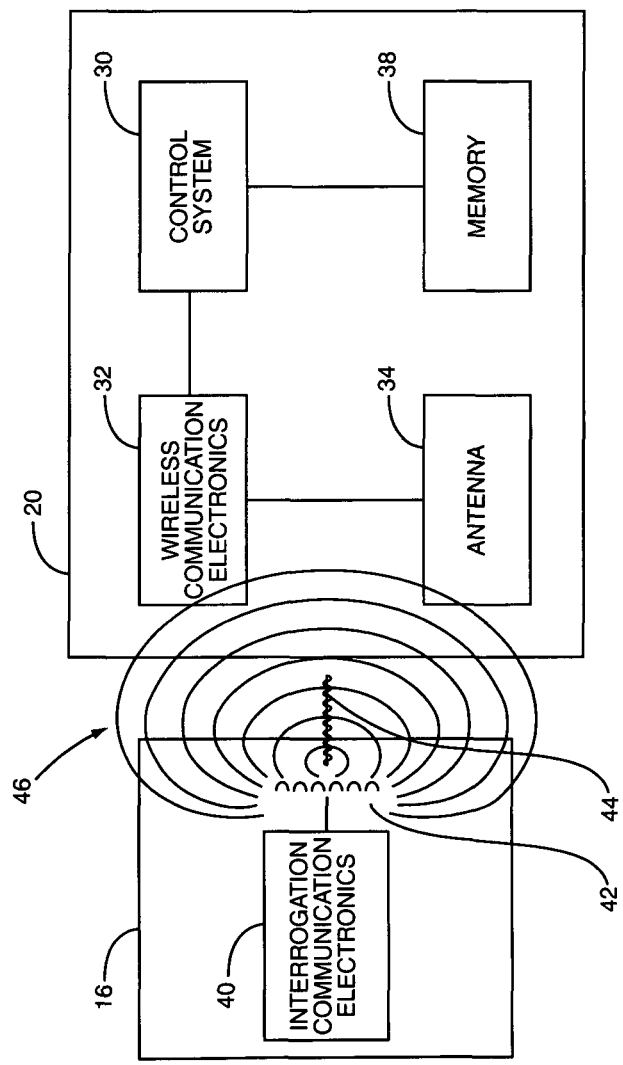
FIG. 3 is a functional block diagram of an interrogator and transponder.

Illustrates examples of transponders placement are shown in FIGS. 2, 2A, 2B, 2C various types of transponders. In FIG. 2A, transponder 20 is installed in customer vehicle 22. In FIG. 2B, transponder 20 is embedded in card 24, of the general size and shape of a conventional credit card. In FIG. 2C, transponder 20 is embedded in key chain fob 26, which could be of a wide variety of sizes and shapes, as dictated by current fashion trends and consumer taste. These examples are illustrative only; the transponder could alternatively take many other forms.

In operation in one embodiment of the present invention, interrogator 16 outputs a single frequency RF signal, with each passive transponder 20 responding by communicating a unique identification code via a responsive signal. Interrogator 16 generates an RF sine wave or other periodic signal that provides power and a synchronized clock source to the transponders 20, and functions as a carrier for returned data from transponders 20. Each transponder 20 contains a coil antenna. The time-varying magnetic field of the electro-magnetic output of interrogator 16 induces an AC voltage in the coil antenna of transponder 20. This voltage is rectified by electronics in the transponder 20, and powers a silicone memory chip and associated logic. Once the transponder 20 has received sufficient energy from its coil antenna to operate correctly, it divides down the RF carrier signal and begins clocking its data to an output transistor connected across the coil antenna. The output transistor shunts the coil sequentially, corresponding to the data being clocked out of the memory array. Shunting the coil causes a momentary fluctuation of the carrier signal, which is detected by interrogator 16. In this manner, commonly referred to as "backscatter modulation," each transponder 20 communicates its unique identification number or code to interrogator 16. Such passive RFID systems are well known in the art. For further explanation, one is directed to "Passive RFID Basics" by Pete Sorrells, publication DS00618A of Microchip Technology Inc., the disclosure of which is incorporated herein in its entirety.

FIG. 3 depicts a functional block diagram of an interrogator 16 and a representative transponder 20. One of ordinary skill in the art will understand that there are many other different types of wireless communication devices that allow electronic communication, and the present invention is not limited to any one particular type. The transponder 20 comprises control system 30, wireless communication electronics 32, antenna 34, and memory 38. The antenna 34 may be either external or incorporated internal to the transponder 20.

The control system 30 is an integrated circuit or other type of microprocessor or micro-controller electronics that controls the substantive operations of the transponder 20. The control system 30 is connected to the wireless communication electronics 32 to communicate and receive transmissions. The control system 30 is also connected to memory 38 for retrieving an identification code.

FIG. 3 also depicts how communication is achieved with the transponder 20. The interrogator 16 contains interrogation communication electronics 40 and an interrogation antenna 42. The interrogator 16 communicates to the transponder 20 by emitting an electronic signal in a frequency 44 through the interrogation antenna 42. The interrogation antenna 42 may be any type of antenna that can radiate the signal 44 through a field 46 so that transponder 20 can receive such signal 44 through its own antenna 34. The field 46 could be any of a variety of different types used in electronic communications including electro-magnetic, magnetic, or electric. The signal 44 may be an RF sine wave or other appropriate signal.

When the transponder antenna 34 is in the presence of the field 46 emitted by the interrogator antenna 42, the wireless communication electronics 32 are energized thereby energizing the transponder 20. The transponder 20 remains energized so long as its antenna 34 is in the field 46 of the interrogator 16. The wireless communication electronics 32 receive the signal 44 and divides down the frequency, generating a synchronous clock that is sent to control system 30 to synchronize its actions. The control system 30 accesses its identification code from memory 38, and encodes the data according to any of several data encoding algorithms as are well known in the art (e.g., Non-Return to Zero (NRZ), Differential Biphase, Manchester Biphase, etc.). The encoded data is serially clocked to wireless communication electronics 32. Wireless communication electronics 32 modulates the data according to any several data modulation algorithms as are well known in the art (e.g., Direct, Frequency Shift Keying, Phase Shift Keying, etc.). Wireless communication electronics 32 then shunts antenna 34, generating backscatter modulation of the field 46 emitted by interrogator antenna 42. Interrogation communications electronics 40 detects the backscatter modulation at interrogator antenna 42 (or alternatively, via another antenna), and demodulates and decodes the received signal to recover the identification code transmitted by transponder 20. RF interrogator/transponder communications systems are disclosed in U.S. Pat. No. 6,031,459 to Lake, entitled "Wireless Communication Devices, Radio Frequency Identification Devices, and Methods of Forming Wireless Communication Devices and Radio Frequency Identification Devices," the disclosure of which is incorporated herein in its entirety.

The foregoing discussion explicates the technology and general environment necessary for an understanding of the present invention. To further describe the environment of the present invention, the disclosure of PCT Patent WO 97/24689 by Dresser Industries, Inc., Mobil Oil Corp., and Texas Instruments, Inc. entitled "Dispensing System and Method with Radio Frequency Customer Identification" is incorporated herein in its entirety. Against this background, the present invention will now be described by reference to various embodiments thereof.

Figure 4:
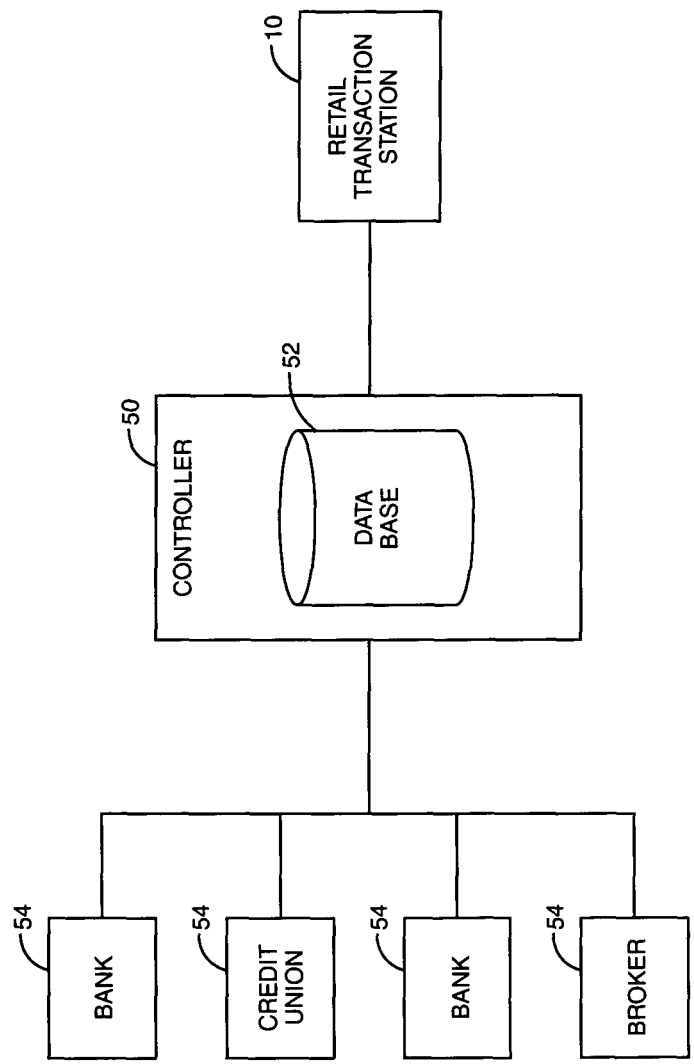
FIG. 4 is a block diagram of a system for processing transactions initiated at a single retail transaction station.

Referring to FIG. 4, the retail transaction station 10 is communicatively connected a controller 50, also referred to herein as a processing station. Controller 50 may be contained within the housing 13 of the retail transaction station 10, or it may be located remotely, as depicted in FIG. 4. Controller 50 is operative to access and control a database 52 that contains customer identifiers and associated transaction account information. The customer identifiers correspond to the identification codes transmitted by each customer's transponder 20 to the interrogator 16 at the retail transaction station 10, and serve to uniquely identify each customer. Alternatively, the transponder 20 identification code could be used to index or generate a separate customer identifier, which could for example be a customer's social security number or driver's license number, or alternatively could be a random or pseudo-random number generated from the transponder identification code. The essential characteristic of a customer identifier is that it uniquely identifies each individual customer. Associated with each customer identifier in the database 52 is information regarding one or more transaction accounts to which the customer may charge the purchase of goods and/or services made at the retail transaction station 10. The transaction account information may be input to the controller 50 for inclusion in the database 52 manually, e.g., by a customer service representative following directions from a mail-in form or from a customer calling a tall-free customer service number.

Figure 5:
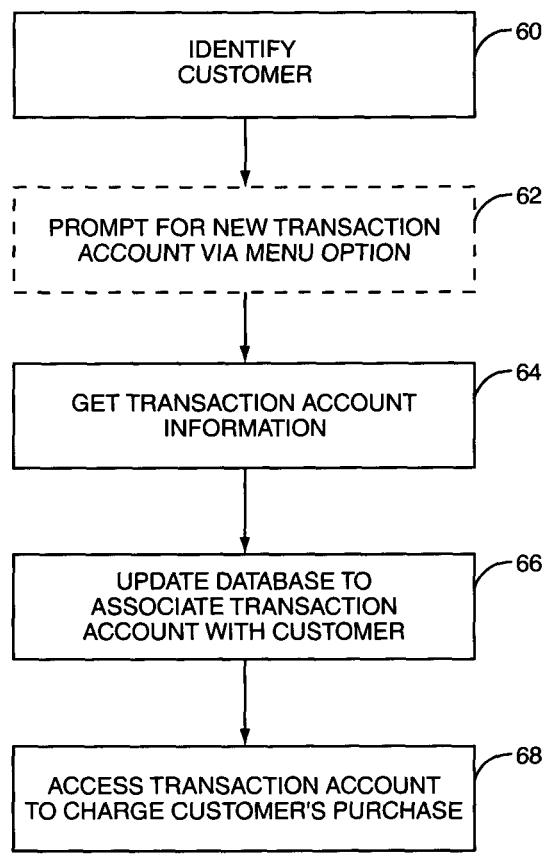
FIG. 5 is a flow chart depicting the process of updating a customer's transaction account information.

Alternatively, according to the present invention, the customer may enter or update the transaction account information associated with his customer identifier in the database 52 by inputting the transaction account information directly at the retail transaction station 10. This process is described in flowchart format in FIG. 5. First, upon the customer's arrival at the retail transaction station 10, interrogator 16 communicates with the customer's transponder 20, thus obtaining a unique code that identifies the customer (step 60). If no corresponding customer identifier is found in database 52, e.g., if the customer has just purchased or been issued a transponder 20, or if no transaction account is associated with the customer identifier, e.g., the customer has not yet submitted information regarding a valid transaction account, the customer is prompted to enter transaction account information, e.g., by swiping a valid credit card through card reader 17. Additionally, if the customer identifier and associated valid transaction account are found in database 52, the customer may optionally be presented with a prompt or menu option inviting him or her to update his or her transaction account (step 62). In either case, the customer enters new transaction account information, e.g., by swiping a credit card through card reader 17, at the retail transaction station (step 64). The transaction account information may, of course, be entered otherwise. The customer may, for example, enter an account number on the keypad 12, or may navigate through a series of menu options utilizing soft function keys 14 in conjunction with display 18 to select from among a plurality of known transaction accounts, or by a variety of other means. Once the customer has been identified and has entered new transaction account information, the customer identifier and the transaction account information are communicated to the controller 50. Controller 50 associates the customer identifier with the transaction account information, and stores the association in the database 52 (step 66). Note that more than one transaction account may be associated with each customer identifier, with the customer selecting from among known transaction accounts, or alternatively entering information regarding a new transaction account, prior to charging the customer's purchase. When the transaction account information has been updated in database 52, the controller 50 may access the associated transaction account to process the customer's purchase of goods and/or services (step 68). This may be accomplished across a wide area network, establishing communication with a variety of financial institutions 54. The specifics of electronic transaction account processing are well known in the art, and are not further explicated herein.

Figure 6:
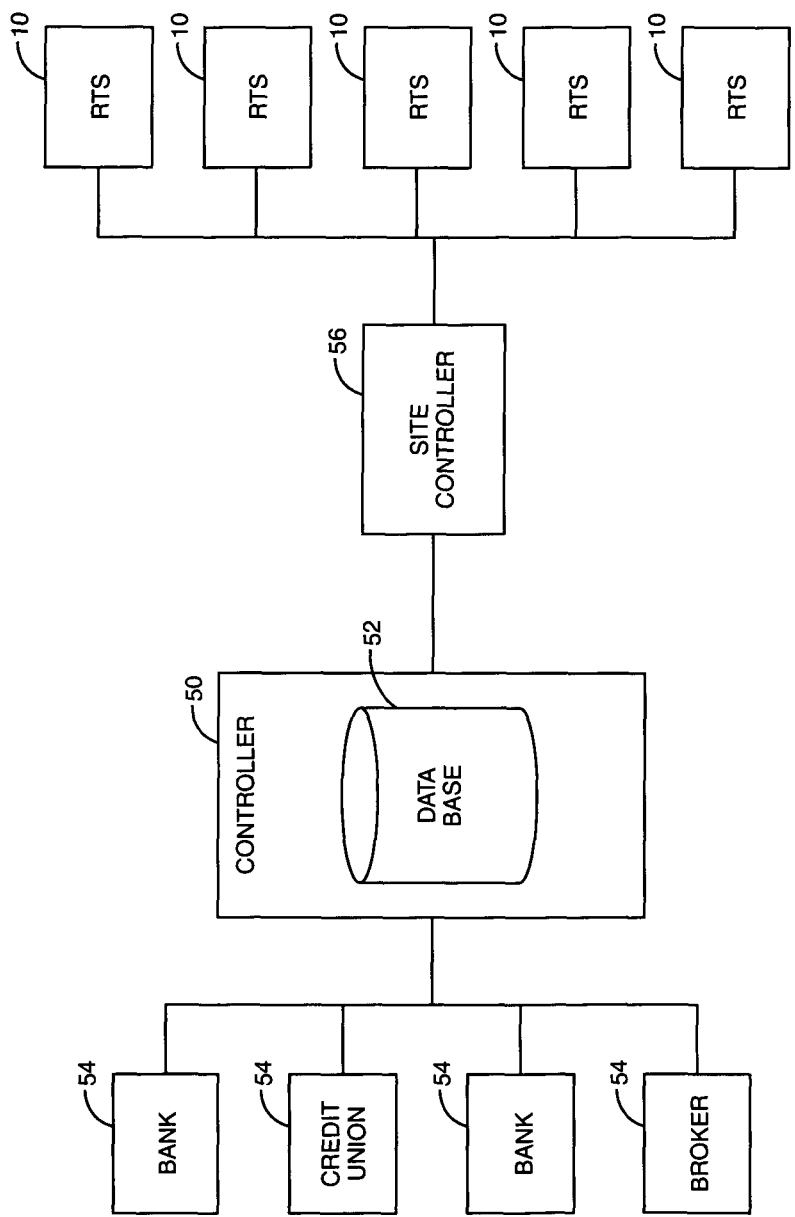
FIG. 6 is a block diagram of a system for processing transactions having a plurality of retail transaction stations controlled by a site controller.

FIG. 6 depicts another embodiment, wherein a plurality of retail transaction stations 10 are controlled by a site controller 56. This configuration is common, for example, at a service station, wherein the retail transaction stations 10 comprise fuel dispensers, and the site controller 56 it is located in an associated kiosk, convenience store, or the like. In this embodiment, the site controller 56 collects customer identifiers and transaction account information from each remote transaction station 10, and forwards the information to controller 50, that is typically located remotely from the site controller 56. Transaction processing by controller 50 proceeds as described above.

Figure 7:
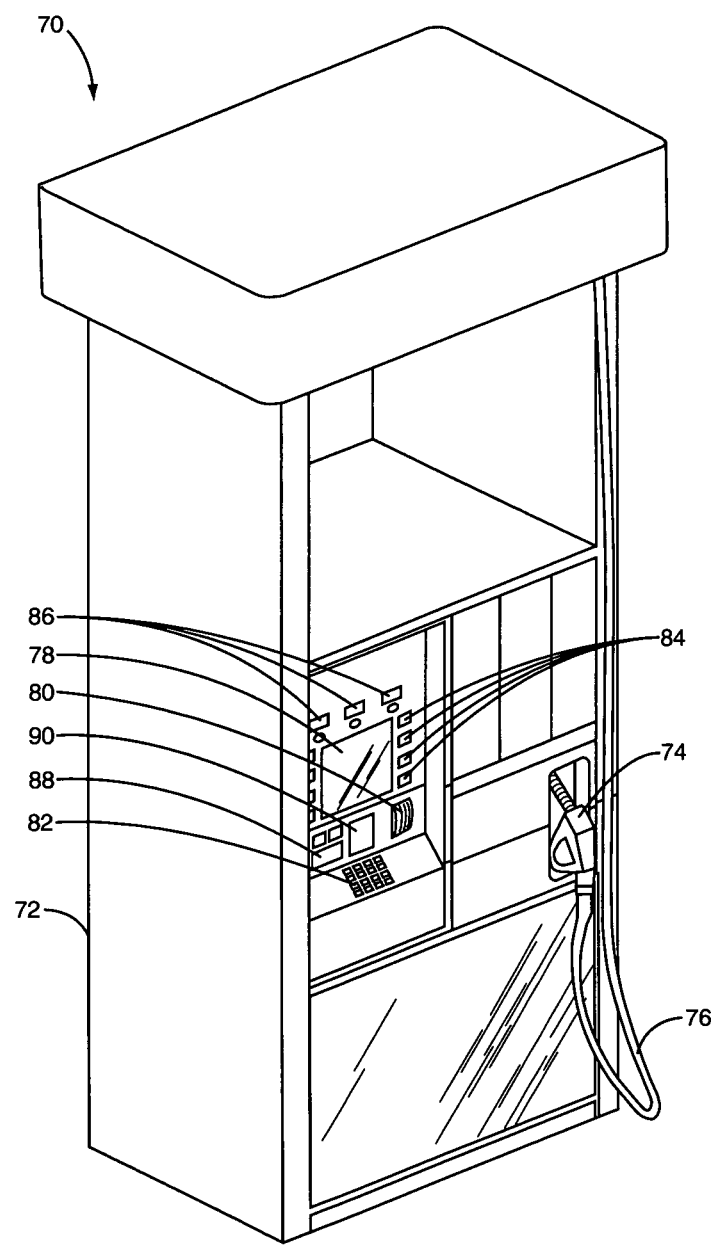
FIG. 7 is a perspective view of a fuel dispenser.

The retail transaction station 10 may be in the form of a fuel dispenser, as depicted in FIG. 7. The fuel dispenser, indicated generally at 70, includes a fuel dispenser housing 72 that contains various pumps, hydraulics, and other electronics (not shown) necessary to perform the fuel dispenser function of transferring fuel from one or more storage tanks (not shown) into a customer's motor vehicle. The fuel dispenser 70 also includes a pump nozzle 74 connected to a hose 76. The hose 76 is connected in fluid flow relationship with a fuel pump (not shown) in the fuel dispenser housing 72.

Fuel dispenser 70 also contains a display 78 disposed in the fuel dispenser housing 72. The display 78 indicates to the customer information relating to the fuel purchase transaction, such as the price of various grades (or octane levels) of fuel available, and a continuously updated readout of the volume of fuel dispensed and the total price. Additionally, the fuel dispenser 70 contains a card reader 80 disposed in the fuel dispenser housing 72 for reading transaction account information from the magnetic stripe of a customer's credit card. A keypad 82 or and soft function keys 84 are provided for customer input, such as selecting menu options, accepting or declining a printed receipt, and the like. Fuel grade selection buttons 86 are disposed in housing 72 for the selection of one of a plurality of grades (or octane) of fuel. A receipt printer 88 is disposed in the fuel dispenser housing 72 for printing a receipt containing an accounting of the fuel purchase transaction. Fuel dispenser 70 also contains an interrogator 90 for identifying customers via communication with customers' transponders.

The fuel dispenser 70 of FIG. 7 is illustrative only, and the present invention is applicable to other types of fuel dispensers other than that shown in FIG. 7. Modern fuel dispensers may contain a broad array of additional mechanisms for identifying and communicating with the customer, dispensing fuel, and effecting payment. For a more complete understanding of the fuel dispenser and its constituent components, the reader is referred to U.S. Pat. No. 5,602,745 to Atchley et al., "Fuel Dispenser Electronics Design," the disclosure of which is incorporated herein in its entirety.

Figure 8:
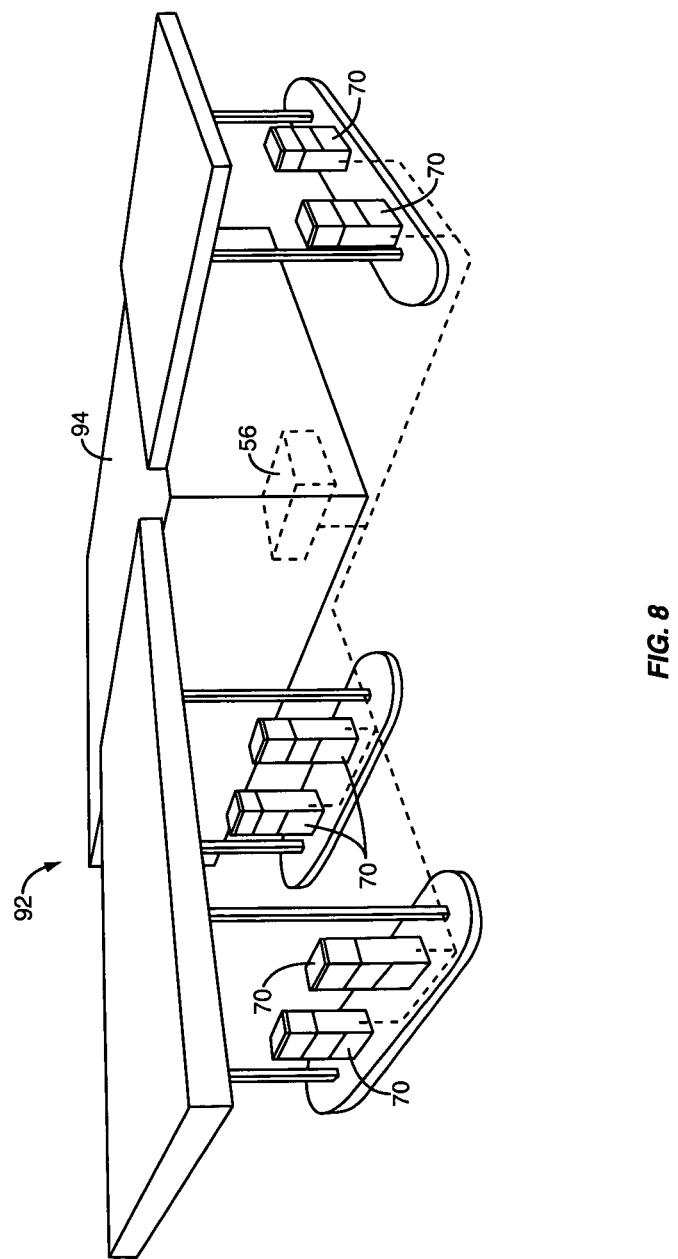
FIG. 8 depicts a plurality of fuel dispensers and a site controller at a service station.

FIG. 8 depicts a typical service station, indicated generally by 92. The service station 92 comprises a plurality of fuel dispensers 70, arranged on islands so as to allow independent fueling from each side of each fuel dispenser 70. Each fuel dispenser 70 is communicatively connected to a site controller 56, located within an appurtenant convenience store 94. In this configuration, each fuel dispenser 70 may contain an interrogator 90 (see FIG. 7) effective to detect and communicate with the customer transponders that come within its range. The transmitting antenna of the interrogator 90 is positioned and calibrated so as to limit the range of the interrogator 90 to an area immediately adjacent to the respective side of the fuel dispenser 70, i.e., the area of pavement directly adjacent to the fuel dispenser 70 that will be occupied by a customer's vehicle during fueling. Site controller 56 is communicatively coupled to a controller 50 containing customer identifier and transaction account information in a database 52, as depicted in FIG. 6.

Figure 9:
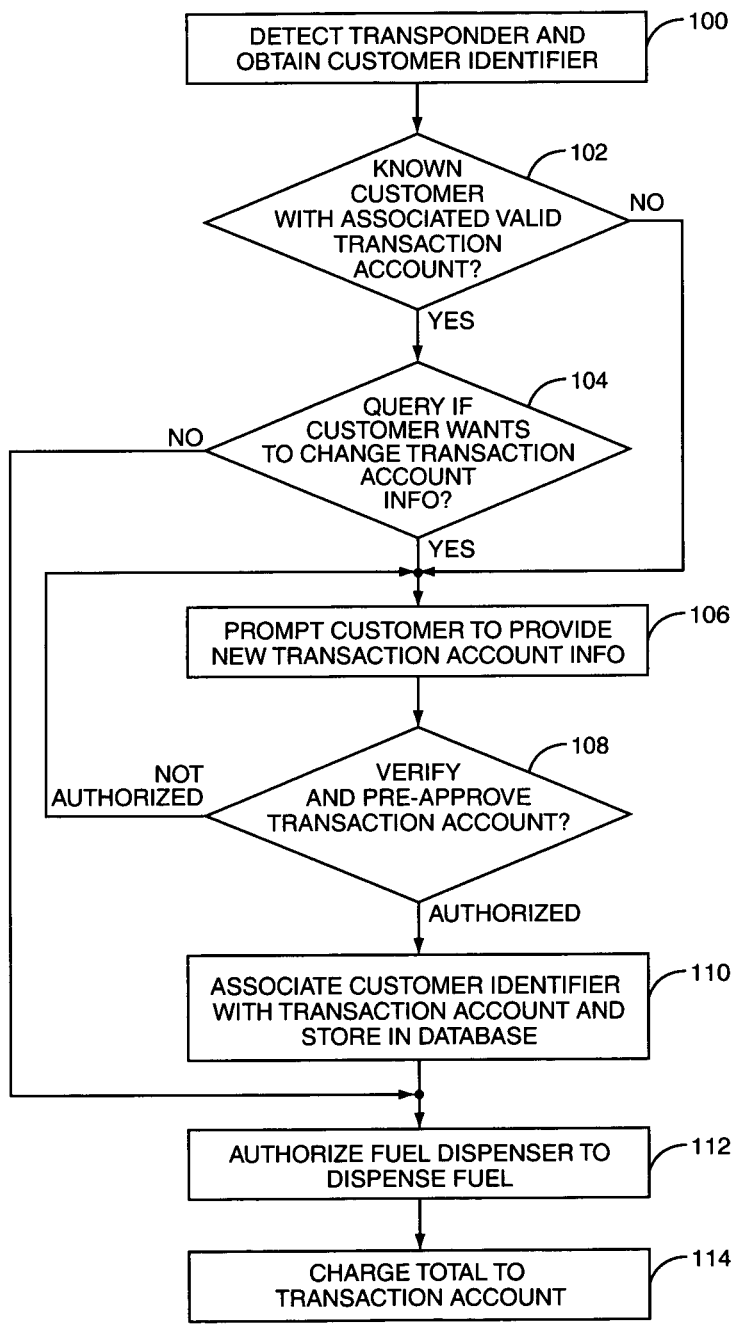
FIG. 9 is a flow chart depicting the process of updating a customer's transaction account information and performing retail transactions at a fuel dispenser.

The fuel purchase transaction processing at a fuel dispenser 70 at service station 92 may proceed according to the flowchart of FIG. 9. When a customer drives up to a particular fuel dispenser 70, and hence within the operative field of the associated interrogator 90, the transponder in the customer's possession or mounted to his vehicle is energized and transmits its identification code. This identification code is received at the interrogator 90 (step 100), and is passed to the site controller 56 and thence on to the controller 50. Controller 50 indexes database 52 with the customer identifier to ascertain whether the customer is known to the system (i.e., the customer identifier is in the database 52), and if so, if there is a valid transaction account associated with that customer identifier (step 102). If the customer is both known and has a valid transaction account in database 52, the customer may be prompted at the fuel dispenser 70 to indicate whether he or she wishes to update the system to access a different transaction account (step 104). If the customer response affirmatively, or alternatively if either the customer identifier or an associated valid transaction account was not found in database 52, then the customer is prompted to enter information regarding a transaction account (step 106). The customer may enter new transaction account information in several ways, e.g., by swiping a credit card through card reader 80 at the fuel dispenser 70. The fuel dispenser 70 may additionally require the customer to enter authorization information, such as a Personal Identification Number (PIN) that may be necessary to authorize the customer's access to the transaction account. The new transaction account information is then forwarded by the site controller 56 to controller 50. Controller 50 verifies, via access across the network to financial institutions 54 (see FIG. 6) that the new transaction account exists, is valid, and that the customer is authorized to access it (step 108). The controller 50 may also at this point pre-authorize a fuel purchase transaction in an amount estimated to approximate the customer's fuel purchase. If the transaction account does not exist, is inactive, or the customer is not authorized to access it, the fuel dispenser 70 prompts the customer to enter information regarding a different transaction account (step 106). If the transaction account is valid and accessible, the controller 50 associates the customer identifier with the transaction account information, and stores the association in the database 52 (step 110). At this point, the customer has been identified, and has a valid transaction account associated with him or her. This is also the case when a customer is recognized and elects not to update his or her transaction account information at step 104. The fuel dispenser 70 is enabled by the site controller 54 (step 112), and the customer or an attendant dispenses fuel into the customer's vehicle, or alternatively, fuel is dispensed automatically via a robotic fuel dispensing system. When the desired amount of fuel has been dispensed into the customer's vehicle and the pump has been disengaged at the fuel dispenser 70, the fuel purchase total, along with any other purchases made by the customer at the fuel dispenser 70, are forwarded by the site controller 54 to controller 50 for processing via the transaction account (step 114). It will be recognized that the process described above and depicted in FIG. 9 is illustrative only, and the present invention is not limited thereby. The procedural steps described may be performed in a different order, some steps may be omitted, and additional steps may be included. Additionally, some of the steps described could be performed in a matter other than that explicated herein.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the spirit and scope of the invention.

What is claimed is:

1. A method implemented by fuel dispenser control electronics of associating a new transaction account in place of an existing transaction account associated with a customer in a database and used for processing payment transactions at a fuel dispenser, said method comprising steps of:
   (a) receiving, via a first reader located at said fuel dispenser, a customer identifier in electronic form, said customer identifier used to identify said customer in said database;
   (b) providing a prompt at said fuel dispenser instructing said customer regarding how to change said existing transaction account in said database;
   (c) receiving, via a second reader located at said fuel dispenser, said new transaction account in electronic form; and
   (d) outputting said new transaction account from said fuel dispenser in electronic form for association with said customer in said database.

2. A method as set forth in claim 1, wherein said first reader is selected from the group consisting of an RFID reader, an optical reader, a card reader, a magnetic stripe card reader, a smart card reader, a biometric reader, and a camera with an associated image recognition system.

3. A method as set forth in claim 1, wherein said first reader is an RFID reader.

4. A method as set forth in claim 2, wherein said RFID reader includes an interrogator located adjacent a front of said fuel dispenser.

5. A method as set forth in claim 2, wherein said second reader is a magnetic stripe card reader.

6. A method as set forth in claim 1, wherein said second reader is a magnetic stripe card reader located adjacent a front of said fuel dispenser.

7. A method as set forth in claim 1, wherein said first reader and said second reader are the same.

8. A method as set forth in claim 1, wherein said fuel dispenser includes a display device and said prompt is provided in step (b) as a visual message displayed on said display device.

9. A method as set forth in claim 7, wherein said visual message is displayed only after said customer is confirmed to be a known customer with said existing transaction account.

10. A method as set forth in claim 1, wherein said fuel dispenser includes a PIN pad and said method further comprises receiving a PIN in electronic form from said customer via said PIN pad.

11. A method as set forth in claim 1, further comprising the step of allowing fuel to be dispensed by said customer after receiving confirmation in electronic form that a transaction using the new transaction account is authorized.

12. A fuel dispenser comprising:
   a housing containing fuel handling components;
   a dispensing hose having a nozzle located at the distal end thereof, said hose being in fluid communication with said fuel handling components;
   a user interface located at a front of said housing, said user interface including at least one reader and a display device; and
   an electronic controller configured to:
   (a) receive, via said at least one reader, a customer identifier in electronic form, said customer identifier being used to identify a customer and an associated existing transaction account in a database;
   (b) provide a prompt on said display device querying said customer regarding how to change said existing transaction account in said database;
   (c) receive, via said at least one reader, to receive a new transaction account in electronic form; and (d) outputting said new transaction account from said fuel dispenser in electronic form for association with said customer in said database.

13. A fuel dispenser as set forth in claim 11, wherein said at least one reader comprises an RFID reader to read said customer identifier.

14. A fuel dispenser as set forth in claim 11 wherein said at least one reader comprises a magnetic stripe card reader to read said new transaction account.

15. A fuel dispenser as set forth in claim 11, wherein said at least one reader comprises a first reader and a second reader to read said customer identifier and said new transaction account, respectively.

16. A fuel dispenser as set forth in claim 11, wherein said electronic controller is configured to provide said prompt only after said customer is confirmed to be a known customer with an existing transaction account.

17. A fuel dispenser as set forth in claim 11, wherein said user interface further includes a PIN pad.

18. A fuel dispenser as set forth in claim 16, wherein said electronic controller is further configured to receive a PIN in electronic form via said PIN pad before outputting said new transaction account.

19. A fuel dispenser as set forth in claim 11, wherein said electronic controller is further configured to allow fuel to be dispensed by said customer after receiving confirmation from a payment network that a transaction using the new transaction account is authorized.

20. A method implemented by control electronics of a retail transaction station to associate a new transaction account in place of an existing transaction account associated with a customer in a database and used for processing payment transactions at said retail transaction station, said method comprising steps of:

(a) interrogating, via an RFID reader at said retail transaction station, an RFID tag carried by said customer to receive therefrom a customer identifier in electronic form, said customer identifier used to identify said customer in said database;
(b) if said customer is confirmed to be a known customer with said existing transaction account, providing a visual prompt on a display device of said retail transaction station regarding how to change said existing transaction account in said database;
(c) receiving, via a magnetic stripe card reader at said retail transaction station, said new transaction account in electronic form;
(d) outputting said new transaction account from said retail transaction station in electronic form for association with said customer in said database; and
(e) processing a retail transaction at said retail transaction station paid via said new transaction account.

\* \* \* \* \*

UNITED STATES PATENT AND TRADEMARK OFFICE
CERTIFICATE OF CORRECTION

| | | |
|---|---|---|
| PATENT NO. | : 8,924,267 B1 | Page 1 of 1 |
| APPLICATION NO. | : 09/685276 | |
| DATED | : December 30, 2014 | |
| INVENTOR(S) | : Steven N. Terranova | |

It is certified that error appears in the above-identified patent and that said Letters Patent is hereby corrected as shown below:

In the specification,

Column 2, lines 60, please delete "FIGS. 2, 2A, 2B, 2C illustrates" and replace with --FIGS. 2, 2A, 2B, and 2C illustrate--.

Column 6, line 45, please delete the sentence "Illustrates examples of transponders placement are shown in FIGS. 2, 2A, 2B, 2C various types of transponders." and replace with the sentence --Illustrative examples of transponder placement are shown in FIGS. 2, 2A, 2B, and 2C, which illustrate various types of transponders.--.

Signed and Sealed this
Twenty-seventh Day of October, 2015

Michelle K. Lee
*Director of the United States Patent and Trademark Office*